US012764420B2

(12) United States Patent
Waitz

(10) Patent No.: US 12,764,420 B2
(45) Date of Patent: Oct. 13, 2026

(54) METHOD FOR MEASURING DISTANCE IN ORDER TO FOCUS AT LEAST ONE CAMERA LENS

(71) Applicant: QINEMATIQ GMBH, Vienna (AT)

(72) Inventor: Martin Waitz, Vienna (AT)

(73) Assignee: QINEMATIQ GMBH, Vienna (AT)

( * ) Notice: Subject to any disclaimer, the term of this patent is extended or adjusted under 35 U.S.C. 154(b) by 0 days.

(21) Appl. No.: 18/747,853

(22) Filed: Jun. 19, 2024

(65) Prior Publication Data

US 2024/0422434 A1 Dec. 19, 2024

Related U.S. Application Data

(62) Division of application No. 17/298,529, filed as application No. PCT/AT2019/060403 on Nov. 28, 2019, now Pat. No. 12,041,349.

(30) Foreign Application Priority Data

Nov. 30, 2018 (AT) .............................. A 51065/2018

(51) Int. Cl.

| | |
|---|---|
| ***H04N 23/67*** | (2023.01) |
| ***G01S 13/10*** | (2006.01) |
| ***G01S 17/10*** | (2020.01) |
| ***G02B 7/40*** | (2021.01) |
| *G01S 17/894* | (2020.01) |

(52) U.S. Cl.

CPC ........... *H04N 23/671* (2023.01); *G01S 13/10* (2013.01); *G01S 17/10* (2013.01); *G02B 7/40* (2013.01); *G01S 17/894* (2020.01)

(58) Field of Classification Search

CPC ...... H04N 23/671; H04N 23/60; G01S 13/10; G01S 17/10; G01S 17/894; G01S 13/867; G02B 7/40; G02B 7/285; G01C 3/00; G03B 13/20

See application file for complete search history.

(56) References Cited

U.S. PATENT DOCUMENTS

| | | | | |
|---|---|---|---|---|
| 4,534,629 | A | 8/1985 | Bogle et al. | |
| 2004/0046938 | A1 * | 3/2004 | Gero | G02B 7/28 352/140 |
| 2007/0285528 | A1 * | 12/2007 | Mise | H04N 23/61 348/222.1 |
| 2017/0085771 | A1 * | 3/2017 | Schwager | H04N 23/72 |

FOREIGN PATENT DOCUMENTS

| | | |
|---|---|---|
| DE | 29701668 U1 | 5/1997 |
| GB | 1162910 A | 9/1969 |

* cited by examiner

*Primary Examiner* — Yogesh K Aggarwal
(74) *Attorney, Agent, or Firm* — Dykema Gossett PLLC

(57) ABSTRACT

Aspects of the present disclosure are directed to, for example, a method for measuring distance in order to focus at least one camera lens of a camera. In one example embodiment of the method, a wide-distance measuring system is used to measure the distance of an object and provide at least one wide measurement value, the wide-distance measuring system includes at least one microwave measuring system, and is further used to focus the camera lens, and at least one further measurement value is provided using at least one further measuring system.

30 Claims, 2 Drawing Sheets

METHOD FOR MEASURING DISTANCE IN ORDER TO FOCUS AT LEAST ONE CAMERA LENS

CROSS-REFERENCE TO RELATED APPLICATIONS

This is a divisional of U.S. application Ser. No. 17/298,529, filed 28 May 2021, which is the national stage filing based upon International application No. PCT/AT2019/060403, filed 28 Nov. 2019, which claims the benefit of priority to Austria application No. A 51065/2018, filed 30 Nov. 2018.

BACKGROUND

The invention relates to a method for measuring distance in order to focus at least one camera lens of a camera, wherein a wide-distance measuring system of the distance-measuring unit suitable for measuring larger distances measures the distance of the object and provides at least one wide-distance measurement value, and wherein the wide-distance measuring system comprises at least one microwave measuring system, and wherein the wide-distance measurement value is used for focusing the camera lens. It also relates to a distance-measuring unit for measuring a distance between a camera and an object for focusing at least one camera lens of a camera on an object, wherein the distance-measuring unit comprises at least one wide-distance measuring system, which is suitable for measuring larger distances and is implemented as a microwave measuring system, for measuring at least one wide-distance measurement value.

GB 1162910 A1 describes a camera that has an ultrasonic measuring unit to measure the distance to an object. Objects can be any object to which the focus or a focus of the camera is to be directed. Usually, these objects are video cameras, i.e. cameras for recording a film. In most cases, these objects are moving people or vehicles, which is why automatic focusing depending on the changing distance or range is a significant relief for the operator and an improvement of the recording.

For decades, ultrasonic measuring units have been used almost exclusively on film sets to determine the distance between the camera and the object. The measuring system is based on the fact that a sensor on the camera emits an ultrasonic signal, which is reflected by the object. The returning signal is received again at the sensor. The distance is determined from the running time. An ultrasonic measuring device usually works without a transponder (passive or active reflector) on the subject. Distance measurement using ultrasound has the following advantages:

Ultrasound is relatively accurate, with accuracy in the lower centimeter range.

Unlike a laser measuring device, an ultrasonic measuring device does not measure in a measuring point, but in a measuring cone. This results in a natural averaging of the measurement. The target is easier to aim at, or the measuring range is smoothed.

Ultrasound is invisible, eye-safe and does not disturb the actors.

However, this measuring cone is also a major disadvantage of ultrasound technology. The further away the subject to be measured is from the camera, the larger the area covered by the cone. Often it is difficult to capture the object correctly at distances of more than 4 meters. Not only the face would be in the measuring cone, but also already the neck or the chest of a person. With such embodiments, a reasonably accurate measurement is practically impossible at distances of over 8 m, since the measuring cone not only detects the person, but also already neighboring objects.

It is known from U.S. Pat. No. 4,534,629 and DE 29701668 U1 that a microwave transmitter can be mounted on a camera. A reflector (transponder, tag) is located on the subject, which reflects the transmitted wave. From the time-of-flight measurement, frequency measurement or determination of the frequency shift or measurement of the field strength, the distance of the subject to the camera can be determined. With this distance measurement, a film camera can be focused. However, the distance measurement is insufficiently accurate for the application. Especially at shorter distances, these inaccuracies are particularly disturbing. In addition, the measurement method is susceptible to interference, since incorrect measurements can occur if a body moves between the object and the camera. If a person stands between the transmitter and the reflector, strong false measurements occur due to multi-path propagation or shadowing of the microwave. Body parts, such as the moving hand, also lead to false measurements when such transponders are worn on the body. The human body itself is a conductive system and leads to distortions in the wave propagation when it moves. This makes it only slightly reliable because the measurement values often jump.

Based on the physical conditions, only limited accuracies can be calculated in the determination of the distance from the wave propagation. In microwave technology, the available bandwidth limits the accuracy of distance determination. Although bandwidth and frequency can theoretically be increased, in practice the transmission of microwaves is subject to different regulatory restrictions and standards worldwide.

It has also been known for many years to measure distances with corresponding ultrasonic sensors. One method is to transmit a microwave signal and an ultrasonic signal simultaneously from a mobile transponder. The receiver receives both signals and can determine the distance from the time difference. But here, too, incorrect measurements occur because of the multi-field propagation and shadowing of the ultrasonic wave.

Neighboring microwave or ultrasonic systems can interfere with each other in the distance measurement due to interference. Such interference is noticeable as jumps in the distance measurement.

A passive radar meter can also be used to measure distances between the measuring device and a subject without a reflector being attached to the subject. Similar to ultrasound, a radar measuring device measures in a measuring cone and thus causes the same problems as with the other measuring methods. Targeting the subject at wide distances becomes difficult or impossible.

In general, aiming at the object is a big problem when determining the distance of objects on the film set. Laser measuring devices are very precise, fast and accurate, but they only measure in one point, and it is not possible to visualize the measuring point on the film set. If a laser measuring device is used to measure a person's face, it is not obvious whether the measuring point is on the chin or already on the person's neck. However, this can already result in a considerable difference in the distance to be determined.

This disadvantage of a point measurement in laser measuring devices would be circumvented by LIDAR sensors. LIDAR sensors do not measure in a measuring cone or measuring point, but measure along a circular segment of several degrees. This circumvents the disadvantage of a point measurement. In contrast to the measuring cone of ultrasonic measurement, however, the area is also well restricted. Targeting the object is thus facilitated. From a certain distance, however, it is difficult or even impossible to distinguish desired targets from undesired objects, even with lidar measuring devices.

Most LIDAR measuring devices are based on a pulsed infrared source, wherein the returning wave is detected by several spatially offset infrared sensors. This measurement method is not only susceptible to sunlight, but also leads to different measurement results for different surfaces of the object.

Ultrasound, LIDAR, laser, or passive radar technology can be used to measure subjects very well and accurately in the lower distance range. At greater distances, however, aligning the measuring device with the subject is difficult and becomes impossible without special auxiliary instruments. People or objects can cast shadows on the subject. In this case, measurement with these measuring instruments is impossible. Although measuring methods for determining greater distances are possible, these are too inaccurate to allow sufficiently precise focusing at close range. Accordingly, they are not used or are used only for special applications.

Regardless of the problem of alignment, of course, they can easily shade the ultrasonic, LIDAR, laser distance-measuring systems. In addition, ultrasound can be easily interfered by neighboring objects. The measurement method of ultrasound is very much subject to environmental influences. For example, temperature fluctuations have a very strong effect on the measurement accuracy. The sound wave is strongly attenuated and only allows a limited range in a form that is useful for the application. The propagation speed of the sound wave is also very slow, in contrast to the microwave. If several systems are used simultaneously in one room, crosstalk must be taken into account.

SUMMARY OF THE INVENTION

Thus, it is the object of the invention to provide a method and a distance-measuring unit of the mentioned kind, which allows an improved focusing.

According to the invention, this object is solved by providing at least one further measuring system which provides at least one further measurement value.

This means that not only the wide-distance measurement value, but also the other measurement value is used to focus the camera lens. For example, the other measurement value and the wide-distance measurement value can be shown to the user of the camera, for example on a display, and the user can decide which measurement value to use for focusing, depending on the distance.

Preferably, a distance parameter is calculated from the further measurement value and the wide-distance measurement value via a transfer function.

It is also solved in that the distance-measuring unit has at least one further measuring system for measuring a further measurement value and an adjustment unit is connected to the further measuring system and to the wide-distance distance-measuring system.

In other words, physically independent measurement methods are merged to achieve an improved distance determination for the focusing of a camera lens. In this way, the disadvantages of the measurement methods can be mutually eliminated or at least reduced.

A combination of the measurement values allows an improvement of the distance determination, because the advantages of the individual measuring methods can be combined, but their weaknesses can be mutually offset. It is important that the measurement methods are based on different physical principles so that the measurement errors do not correlate. For example, this also allows erroneous measurement values from one measurement value to be weighted weaker by the other or even identified and not included in the calculation at all.

Preferably, microwaves, i.e. electromagnetic waves, are used which lie in a frequency range from 1 GHz to 122 GHz, particularly preferably from 1.5 GHz to 10 GHz. Even more preferably, microwaves in a wavelength range from 2 GHz to 9 GHz are used.

It is particularly advantageous if the further measurement value is a distance measurement value. This means that the further measurement value outputs a measurement value corresponding to the distance to the object.

In this respect, it is particularly advantageous if the further measuring system comprises at least one short-distance measuring system suitable for measuring short distances and measures the distance of the object to the camera and provides at least one short-distance measurement value as a further measurement value. Accordingly, it can also be provided that the further measuring system comprises at least one short-distance measuring system suitable for measuring smaller distances for measuring at least one short-distance measurement value as a further measurement value.

It may also be provided that the further measurement value is a directional value, a velocity value, or an acceleration value of the object.

In this respect, it is particularly advantageous if the further measuring system comprises at least one acceleration sensor of at least one marking device attached to the object and the acceleration sensor provides at least one acceleration value and that the acceleration value is used to calculate the further measurement value. Accordingly, it can be provided that at least one marking device for attachment to the object of the further measuring system has at least one acceleration sensor for measuring at least one acceleration measurement value for calculating the further measurement value.

It is also particularly advantageous if a computing unit of the adjustment unit weights the wide-distance measurement value and the further measurement value depending on a transfer function and calculates the distance parameter from this, or accordingly if the further measurement value and the wide-distance measurement value are weighted differently depending on the transfer function when calculating the distance parameter.

The transfer function determines to what extent the further measurement value and the wide-distance measurement value are included in the calculation of the distance parameter. The distance parameter is a parameter that can be used to focus the camera optics so that the optics can be adjusted to an object so that it is sharply imaged. The transfer function has at least one setting value as input value, which determines whether, in which form or in which intensity the measurement values are included in the calculation.

The short-distance measuring system is optimized to provide good distance measurement values at closer distances, while the wide-distance measuring system is optimized to provide good distance measurement values at greater distances. The poorer measurement values of the short-distance measuring system at further distances can be compensated by the measurement values of the wide-distance measuring system and vice versa.

This enables the extension of the distance range by providing a sufficiently good distance measurement and thus focusing. Only one distance-measuring system is needed, which automatically selects the correct focusing and there is no need to use several focusing devices, which have to be activated and deactivated manually by the operator of the camera depending on the distance.

If the adjustment unit is set up to calculate a distance parameter from the further measurement value and the wide-distance measurement value via a transfer function, a distance parameter can be calculated easily and quickly from the measurement values and this can be used to adjust the camera lens.

It can be provided that the further measurement value and the wide-distance measurement value are weighted differently depending on the transfer function when calculating the distance parameter. This has the advantage that, depending on the transfer function, a decision can be made about the current importance of each measurement value for determining the distance parameter. For example, the weighting of the wide-distance measurement value is preferably higher for longer distance than for shorter distance. Accordingly, the weighting of the short-distance measurement value may preferably be stronger when the object is close to the camera and weaker when the object is farther away. In a middle-distance range, for example, a slow shift of the weightings can take place or an abrupt one.

Weighting means in this case that the influence of the measurement values on the distance parameter is selected differently. In the simplest case, this can be carried out by a weighting multiplier, which is multiplied by the measurement value.

To enable a particularly simple but nevertheless accurate calculation of the distance parameter, the weighted further measurement value and the weighted wide-distance measurement value can be added to calculate the distance parameter. In this way, the measurement values can be processed without much computational effort. Alternatively, an average value can also be calculated from the weighted measurement values.

In a preferred embodiment, the measurement values are fed to a Kalman filter, wherein the general conditions of the individual measurement methods are predetermined to the model. The expected value depends on the technology, which determines the measurement quality, whether the distance value was or must be false. Thus, there is a quality criterion, a quality factor and a transfer function.

In addition, it is possible that the further measurement value below a threshold setting value of the transfer function is weighted more strongly by the transfer function than the wide-distance measurement value and that the further measurement value above the threshold setting value is weighted more weakly by the transfer function than the wide-distance measurement value. This is particularly advantageous if the further measurement value at wide distances is of consistently poor quality and the wide-distance measurement value at close distances is of consistently poor quality when a distance value is taken as the setting value.

In this context, the distance at which a measuring system works well is strongly dependent on the type or technology of the measuring system and the type of camera focusing. Accordingly, the weighting of the measurement values is strongly dependent on the characteristics of the measuring systems. It is possible to weight the short-distance measurement value more than the wide-distance measurement value, at least for distances less than 4 m of the object, and to weight the wide-distance measurement value more than the short-distance measurement value, at least for distances greater than 8 m. This is advantageous for many common short-distance measuring systems and wide-distance measuring systems. However, the distances can be changed depending on the type of measuring systems or the current requirements, preferably by the user of the camera.

The setting values can be selected in different ways. It is particularly simple and fast if the setting value of the transfer function is made dependent on at least the further measurement value, the wide-distance measurement value or both. In this way, the output values of the transfer function can be determined quickly. The combination, for example the mean value of the measurement values or of a part of the measurement values, can also serve as the setting value.

It is particularly advantageous if at least one setting value of the transfer function is made dependent on the distance parameter. In this way, the already optimized value that is particularly close to the true distance between the camera and the object is used as the initial value. Preferably, the distance parameter calculated in a previous calculation step is used. At the beginning of the procedure, when no distance parameter is yet available, an initial value such as a default value, the last distance parameter during the last measurement or another value such as the average value of the measurement values or only one measurement value can be used. When performing several cycles of the distance parameter determination, the distance parameter is then automatically shifted to its optimum within the shortest possible time.

Alternatively, at least one setting value of the transfer function can be made dependent on the time change of the further measurement value, the wide-distance measurement value or both. In particular, if a value is not very susceptible to abrupt jumps, smoothing can be brought about in this way.

For better handling and for better adjustment to the current conditions, it can be advantageous if at least one characteristic parameter of the transfer function is adjustable for the user of the camera. In this way, the user of the camera can set changed rotation conditions, such as shots inside or shots outside, and thus optimize the distance parameter. The characteristic parameter can be, for example, a slope, a shift of a curve, a gain factor or a characteristic value of the transfer function.

It can also be provided that only the one measurement value is used in one distance range and only the other measurement value is used in another distance range, wherein a handover between the measurement values takes place in the range between the distance ranges. The handover can be carried out automatically or it is specified by the user, as well as the range where the handover should start and finish. The transfer function can be linear or exponential in this range, for example.

However, it is not absolutely necessary for a transponder-based measuring system to be used in the wide-distance range and a transponderless one in the short-distance range. It can also be the other way around. For example, the magnetic field strength (=amplitude) of a sensor can be measured very well and accurately in the close range below 1 m. The short-distance measuring system can therefore have several different measuring systems, possibly used for different distances. It is therefore possible in ranges below 1 m to perform a distance measurement based on the field strength. In the mid-range of 0.8-5 m, ultrasound is used for measurement and above 5 m, the system switches to the microwave measuring system. The choice of which technology or technologies to use as a short-distance measuring system and which to use as a wide-distance measuring system should be made depending on the environment in which the camera will be used or the distance ranges in which the object is likely to move.

In the short-distance range of the film camera, measurements can be made very well with transponderless reflective measuring devices (such as ultrasound, laser, LIDAR, radar without reflector), since it is very easy to aim at the subject at close distances to the camera. Ultrasonic and LIDAR measuring devices measure the closest point in this range in the measuring cone or measuring segment, or allow averaging of the measurement values in this range, which is usually also desired.

Furthermore, it is advantageous if the short-distance distance-measuring system comprises at least one ultrasonic measuring system, radar measuring system, stereoscopic camera arrangement, TOP camera or LIDAR measuring system, or if the short-distance distance-measuring system has an ultrasonic measuring system, radar measuring system or LIDAR measuring system. Ultrasonic measuring systems are already known and are very well suited for close range applications. However, their inaccuracy and susceptibility to error increases with increasing distance. Normally, their values are very poor from a distance of 8 m or 10 m between the object and the ultrasonic measuring system. Here, ultrasonic measuring system means a distance-measuring system that measures the distance to the object by means of ultrasonic waves.

Preferably, the radar measuring system uses radar waves in the wavelength range from 20 GHz to 300 GHz.

Preferably, the ultrasonic measuring system uses ultrasonic waves in the frequency range from 1 kHz to 1 GHz, preferably from 16 kHz to 1 GHz. It may also be provided that the short-distance measuring system has a field strength measuring system. This can determine the distance of an object by measuring the field strength.

It is also possible for the short-distance distance-measuring system to comprise at least one LIDAR measuring system. In this case, a pulsating infrared beam is emitted and the backscattered light is detected by spatially offset sensors in the measuring system. In this way, the distance to the backscattering object can be measured.

It can also be provided that the short-distance measuring system comprises at least one radar measuring system. A modulated microwave is emitted, which is reflected by the object. A distance value can be calculated from the change in the transmitted wave to the reflected wave.

In this sense, it can be provided that an ultrasonic emitter of the ultrasonic measuring system emits ultrasonic waves in at least one direction in the area of the camera and that reflections of these ultrasonic waves are detected by an ultrasonic sensor and that a calculator unit calculates a short-distance measurement value of the reflecting object.

If the wide-distance measuring system comprises at least one microwave measuring system or if the wide-distance measuring system comprises a microwave measuring system, a wide-distance value can be generated in an exact and safe manner. Here, microwave measuring system means a distance-measuring system that can determine the distance by microwave radiation.

In this respect, it can be provided that the microwave measuring system emits microwave signals via a microwave emitter in the area of the camera and at least one portable microwave responder of at least one marking device attached to the object responds to the microwave signals or the wide-distance measuring system has a portable marking device for attachment to the object, which preferably has a microwave responder. The marking device may be small in size, for example, and may be placed in a person's pocket or attached to the body if that person is the object to be focused on. The microwave emitter, which is usually attached directly to the camera, emits microwaves which are received by the microwave responder, which responds by emitting a response signal in the form of microwaves.

A reflector (active, or passive) can be used as a microwave responder. A base station of the distance-measuring unit is preferably arranged at the camera, which emits an electromagnetic wave and measures the signal from the transponder. From the time-of-flight measurement, the time, frequency, phase shift within the wave travelling back and forth, within the wave information or in relation to a reference signal, the distance can be calculated.

In an ideal embodiment, the microwave unit on the marking device has the property of transmitting data signals to the base station.

Preferably, the microwave system is a UWB (ultra-wideband) or radar-based distance-measuring system, wherein a large available bandwidth also corresponds to a large measurement accuracy.

A particular increase in accuracy can be achieved by attaching multiple marking units to the object to be focused to obtain multiple distance signals that are averaged. Typically, the object to be focused is a person whose face or head is to be focused on. If corresponding transponders are now attached to both shoulders or both arms, for example, then focusing on the person's body axis can be achieved by averaging the distance signals. Averaging alone reduces the effect of any interference with distance determination at a transponder.

A particularly large increase in measurement accuracy can be achieved if a physical non-correlating measuring system other than the previous measurement methods is used to determine the distance.

A good correction of measurement values can be achieved if at least one acceleration measurement value of at least one acceleration sensor of the marking device is used to correct the wide-distance measurement value or if the marking device has at least one acceleration sensor. Acceleration sensors react very precisely to instantaneous changes in short time intervals. Therefore, the measurement values of inertial measuring systems can be improved by the acceleration measurement value.

Advantageously, the marking device has at least one inertial navigation system having at least the acceleration sensor and at least one rotation rate sensor.

However, a particularly large increase in accuracy can be achieved by the averaging being weighted, wherein the weighting is determined as a function of signals from the respective acceleration sensor. In this way, the fact can be taken into account that the extrapolation has in principle a lower accuracy than the undisturbed measurement when a disturbance is detected. The effect of this inaccuracy on the final result can be achieved by reducing the corresponding weight during averaging.

An acceleration sensor is provided with the property that a change in displacement can be measured by a double integration over time. This displacement measurement is very accurate in a sufficiently short time interval. However, it becomes very inaccurate in a longer measurement interval due to drifts and noise in the sensor as a result of integration over time, the error grows exponentially and the measurement method becomes unusable for distance determination. The advantage, however, is that these errors do not correlate with the errors of a short-distance or wide-distance measuring system described here. If there are jumps in the distance measurement in the short-distance or wide-distance measuring system due to shadowing or multi-path propagation, for example from people passing by who interfere with the measurement, these jumps do not appear in the acceleration measuring system.

An acceleration sensor cannot perform an absolute distance measurement in relation to a coordinate system, but only measures relative distance changes in a specific time frame. This means that no absolute distance can be determined between a marking unit and a base station, but only distance changes in a time frame. An ultrasonic or microwave measuring system performs an absolute distance measurement between the object and the base station. However, the relative distance changes measured by the acceleration sensor can be compared with the distance changes of an absolute measuring system. This eliminates erroneous jumps in the distance determination of the absolute measuring system. This improves the distance determination.

In this context, the time in which a measuring system functions well is strongly dependent on the type or technology of the measuring system. Accordingly, the weighting of the measurement values is strongly dependent on the characteristics of the measuring systems. It is possible to weight the short time measurement value more than the long time measurement value, at least for distances less than 1 s of the object, and to weight the long time measurement value more than the short time measurement value, at least for distances greater than 3 s. This is advantageous for many common measuring systems. However, the times can be changed depending on the type of measuring systems or the current requirements, preferably by the user of the camera.

The wide-distance measuring system and the further measuring system can each have several sensors or distance measuring devices. In this case, the collected values can be used to correct each other and thus output a common wide-distance measurement value or further measurement value. Alternatively, it may also be provided that one sensor or distance measuring device is used to correct both the wide-distance measurement value and the further measurement value.

An inertial navigation system measures very accurate distance change at short time intervals. However, the error grows exponentially over time due to the inaccuracy of the sensor. An absolute distance-measuring system is very prone to error in short time frames and becomes very accurate when many measurements are averaged over a long time frame, for example, or weighted by filtering. Thus, the inertial navigation system has a different quality criterion than an absolute distance-measuring system. These two technologies are independent of each other. A transfer function between the short-term measuring system and the wide-term measuring system can also be defined here.

It is particularly advantageous to use at least one IMU measurement value of at least one inertial navigation system, which comprises at least the acceleration sensor and at least one rate-of-rotation sensor, as a further measurement value, or the inertial navigation system is connected to the wide-distance measuring system and transmits the data of the inertial navigation system by radio. This inertial navigation system, also called IMU (Inertial Measurement Unit), can also have further sensors whose measurement values are combined with each other.

It is also particularly advantageous if at least one IMU measurement value is used to correct the short-distance measurement value.

It is of particular advantage if a further inertial navigation system is also additionally integrated in the base station on the camera. If the data is transmitted from the inertial navigation system of the marking unit to the base station, the relative movement and direction of movement of the camera in relation to the object can be inferred from the two common accelerations and orientations of the base station and the marking unit in a computing unit. This advantageous if the camera itself is not at rest but is moved in space.

Ultrasound (alternatively also laser, lidar, . . . ), microwave transponder and IMU are physically independent measuring methods. All these technologies have different and independent measurement characteristics. All of them have a certain measurement quality for the application (and therefore an advantage in total)—ultrasound (laser, lidar) is often inaccurate or error-prone above 8 m if the measuring device is not specially aligned—microwave transponders, on the other hand, are poor below 4 m-IMU is time-dependent and poor at evaluation periods of more than 1 second. All technologies experience problems at high speeds above 200 km/h.

Inertial navigation systems or IMUs (Inertial Measurement Units) usually have, in addition to acceleration sensors, rate-of-rotation sensors (also called gyroscopes, which determine the rotational movement of the sensor) and magnetic field sensors. If the base station and transponder are set up spatially in relation to each other, the base station can always be mounted in the same orientation on the camera and the transponder is calibrated in position (for example, when the transponder is switched on, it is held parallel to the base station). In this way, the inertial system of the base station and transponder can be determined in relation to the earth's magnetic field.

Basic problem in radio transmission (and distance measurement from it) is interference, shadowing and multi-path propagation. Radio transmission is disturbed by conductive bodies and the propagation path of the electromagnetic wave is distorted. Therefore, the range measurement "jumps" in the presence of interference, even if it is stabilized by Kalman filtering, for example. For example, if a person passes through the line of sight between the transmitter and the transponder, the lengthening of the propagation path can cause a jump in the distance. However, if the acceleration (and thus the change in distance) of the transmitter and transponder is measured at the same time, this jump can be stabilized because the jump can never be larger than the measurement values of the acceleration sensors. If the transmitter and the transponder are at rest (which corresponds to a stationary camera and a stationary object) or have a uniform motion, the jump can be corrected completely at all. If the speed of the transmitter and the transponder is quasi constant, no acceleration has to be measured. Standstill and uniform movements are an important application.

From the past of the movement it can be concluded how the acceleration vectors of the sensor relate to the acceleration vectors of the object. If the distance measurement leads to no change in distance, but the acceleration vectors of the sensor have changes, then the change in movement must be radial to the base station. From this, it can be concluded how the base station and transponder relate to each other.

It is therefore also advantageous if both the base station and the transponder have an acceleration sensor. Accordingly, it can be provided that a further acceleration sensor is attached to the camera, which is used to correct the wide-distance measurement value. This value can obviously also be used to correct the short-distance measurement value. This makes it possible to account for situations in which the film camera is noticeably moved, especially when the film camera is freely carried by an operator. Base station, which sits on the camera, and marking unit, which sits on the object, are thus detected in relative position to each other by the inertial navigation system. The condition is that the data from the inertial navigation system of the marking unit to the base station are permanently transmitted and jointly evaluated in a computing unit. It is advantageous if the microwave measuring system can also transmit the data simultaneously.

Since most short-distance measuring systems are directional, i.e. can only perceive objects in certain directions, it is advantageous if the wide-distance measuring system provides at least one directional value dependent on the direction of the object to the camera and at least the orientation of the short-distance measuring system is made dependent on the directional value. For example, if waves are emitted by the short-distance measuring system only in a certain direction or only in certain directions, the focus of the emission can thus be adapted to the position of the object. In particular, directional and acceleration values of the wide-distance measuring system can be advantageous. The alignment can be achieved, for example, by a motorized guidance of the short-distance measuring system. Accordingly, it may also be advantageous if the inertial navigation system is connected to a direction setting device of the short-distance measuring system. Alternatively, directional values that are essentially independent of the wide-distance measuring system can also be used, for example values calculated by image recognition or values recorded by independent sensors.

The camera can be focused in various ways. The distance-measuring unit can have a display on which the distance parameter is shown. The operator uses this distance display as a reference signal and controls the focus manually. Independently of this, the distance-measuring unit can have an interface to a lens control system. The distance parameter is transmitted to the lens control system. There it directly controls a lens motor or it is displayed on a control display. The operator uses this distance parameter as a reference signal and controls the focus manually. However, the lens motor can also be mounted or connected directly in the distance-measuring unit. In the distance-measuring unit, the measured distance parameters are converted into the focusing position for a motor. The motor moves to these position values and thus controls the focus lens on the camera. The system can also use this to control the focus automatically. In all cases, it is possible to enter the offset between the film sensor plane and the distance-measuring unit in the distance-measuring unit so that the distance displayed corresponds to the distance between the film plane and the object.

The measurement values can also be used for other camera settings. For example, they can also be used to control the zoom. This ensures that a subject moving towards or away from the camera can always be filmed with the same image section. The distance parameter can also be used as a suitable value for setting, or another parameter can be calculated using a further transfer function.

In addition, it can be provided that the adjustment unit for transmitting the wide-distance measurement value and the further measurement value is connected to a display device, preferably a screen, for displaying the transmitted wide-distance measurement value and for displaying the transmitted further measurement value.

BRIEF DESCRIPTION OF THE DRAWINGS

In the following, the invention is explained in more detail with reference to a non-limiting embodiment in the figures, wherein.

DETAILED DESCRIPTION

Figure 1:
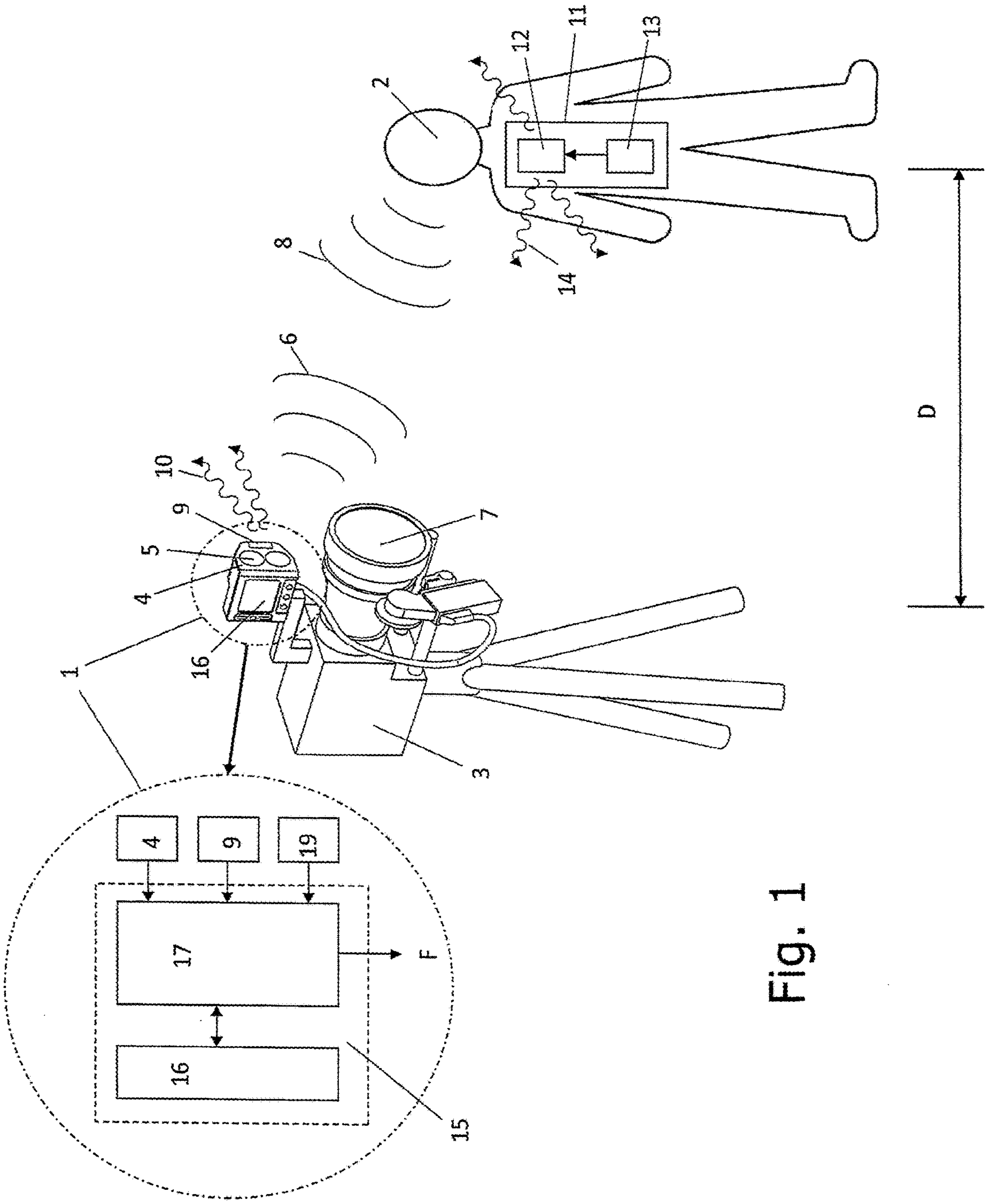
FIG. 1 shows a camera with a distance-measuring unit according to the invention during use in a schematic representation.

FIG. 1 shows a person representing the object 2 to be focused and a camera 3 with a base station 1 of a distance-measuring unit arranged on it. The distance-measuring unit uses the method according to the invention.

A further measuring system designed as a short-distance measuring system 4 has an ultrasonic measuring system 5 which is aligned in such a way that it emits ultrasonic waves 6 via an ultrasonic emitter in the direction in which a camera lens 7 of the camera 3 is directed. These are reflected by the head area of the person, resulting in oppositely directed reflection waves 8. These are received by an ultrasonic sensor of the ultrasonic measuring system 5 and, based on the time shift between transmission and reception, phase shifts or other detectable characteristics, a further measurement value executed as a short-distance measurement value can be calculated by a calculator unit of the ultrasonic measuring system, which corresponds approximately to the distance D between the camera and the face of the object 2.

A wide-distance measuring system has a microwave measuring system 9 having a microwave emitter arranged in the distance-measuring unit 1. This microwave emitter emits non-directional microwave signals 10. On the chest of the person, under his clothing and therefore not visible, a marking unit 11 of the distance-measuring unit is arranged, which has a microwave responder 12 and an inertial navigation system 13. The microwave responder 12 emits response waves 14 in all directions when receiving the microwave signals 10. These can be received by a microwave sensor unit of the microwave measuring system 9 in the distance-measuring unit 1, and based on the comparison between the transmitted microwave and the received microwave, a wide-distance measurement value can be calculated, which approximately corresponds to the distance D between the camera and the object 2.

The microwave signal is a very broadband electromagnetic wave, like a broadband radar signal or an ultra-wideband (UWB) signal.

The inertial navigation system 13 has a plurality of sensors, including acceleration sensors, gyro sensors, and a magnetic field sensor, that can determine the instantaneous position and movement of the marking unit 11.

The data from the inertial navigation system 13 is sent by radio from the microwave responder 12 to the microwave measuring system 9, where it is used in the computing unit 17 to correct the other distance measurements.

In the base station of the distance-measuring unit 1 there is another inertial navigation system 19, which also comprises several sensors in order to be able to determine the current position and movement of the camera 1. The data from the inertial navigation system 19 is also fed to the computing unit 17.

Figure 2:
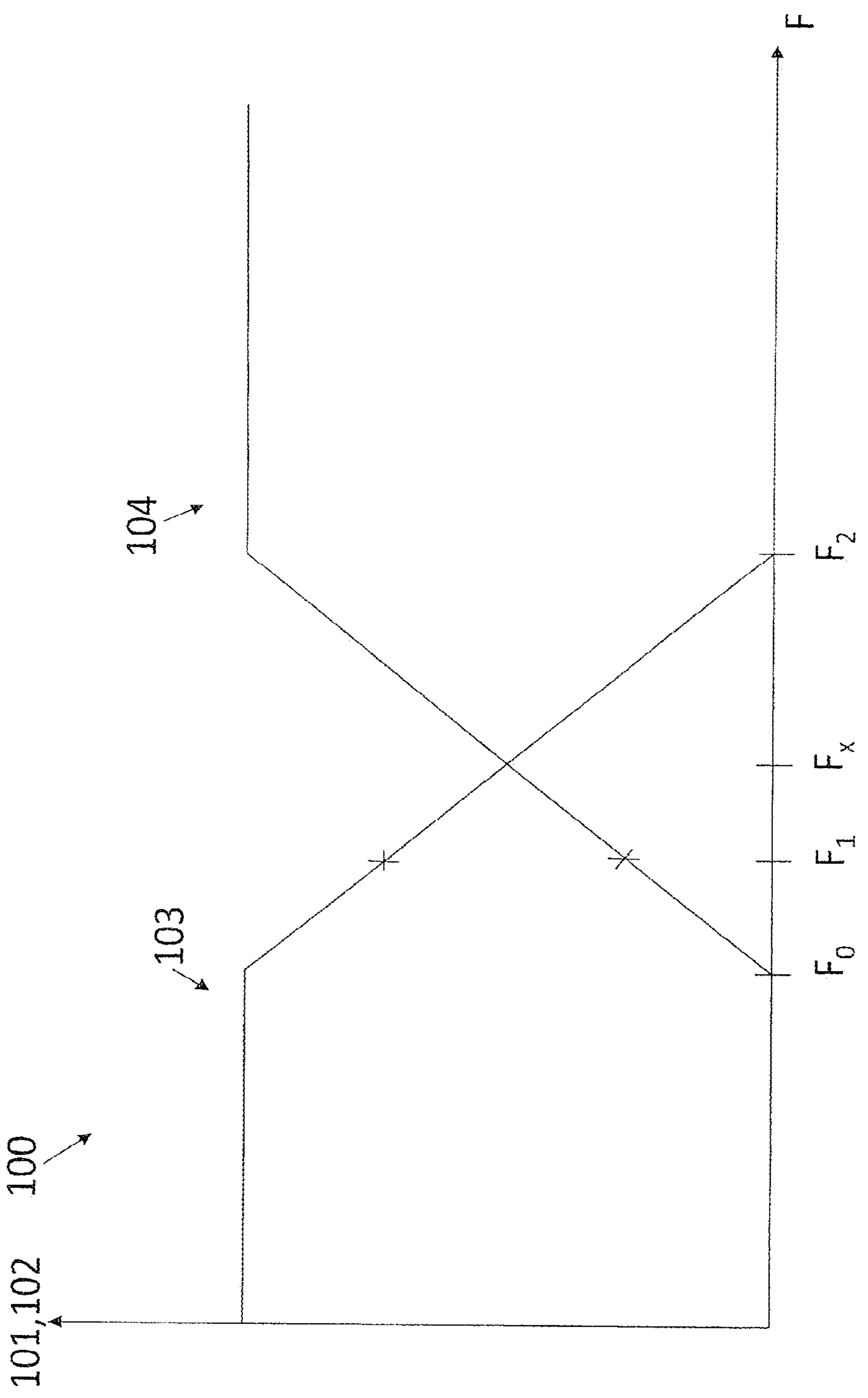
FIG. 2 shows a transfer function of the distance-measuring unit.

An adjustment unit 15 receives at least the wide-distance measurement value and the short-distance measurement value from the wide-distance measuring system and the short-distance measuring system, preferably also the data from the inertial navigation system 13. The inertial navigation system can provide at least a second further measurement value in parallel with the short-distance measuring system. A computing unit 17 of the adjustment unit 15 calculates, on the basis of a transfer function 100 as shown in FIG. 2, a distance parameter F based on the measurement values, which reflects the distance D as accurately as possible. This is output to a display 16, for example in meters or centimeters, so that the operator of the camera 3 can adjust the focus according to the distance parameter. The computing unit also has an interface to a lens control system, wherein the distance parameters are output with this, or a motor for focusing the lens can be connected directly.

FIG. 2 shows a possible transfer function 100 consisting of two overlapping curves 103, 104. A second curve 104 represents the course of a wide-distance weighting factor 102 and a first curve 103 represents the course of a short-distance weighting factor 101, in each case as a function of the distance parameter F. The distance parameter F of the previous calculation cycle is used as the setting value. For each setting value, a value is obtained for the wide-distance weighting factor 102 and the short-distance weighting factor 101. A computing unit 17 of the adjustment unit 15 calculates the factors 101, 102 from the transfer function 100 and multiplies the wide-distance weighting factor 102 by the wide-distance measurement value and the short-distance weighting factor 101 by the short-distance measurement value. In a further step, these two products are added together, resulting in a new function parameter F as the sum of the products. If no function parameter F is available, for example because the system has just been switched on for the first time, half of the sum of the wide-distance measurement value and the short-distance measurement value can be used instead.

The factors 101, 102 can assume values from 0 to 1. For example, if the distance parameter F is the value F1, the short-distance weighting factor 101 is about 0.75 and the wide-distance weighting factor 102 is about 0.25. At a value below a first threshold value F0, which in this embodiment corresponds approximately to a distance D of 5 m, the short-distance weighting factor 101 has the value 1 and the wide-distance weighting factor 102 has the value 0. Thus, the wide-distance measurement value is not included in the calculation. After the threshold value F0, the value of the wide-distance weighting factor 102 increases linearly, while the value of the short-distance weighting factor 101 decreases linearly, up to a further threshold value F2, at which the wide weighting factor 102 assumes the value 1 and the short-distance weighting factor 101 is 0. Threshold value F2 represents a distance of 7 m.

At 6 m, a threshold Fx is reached below which the short-distance weighting factor 101 is greater than the wide-distance weighting factor 102 and above which the wide-distance weighting factor 102 is greater than the short-distance weighting factor 101.

The curves 103, 104 are created in such a way that their sum in each focusing parameter results in F1. In alternative embodiments, in particular with other types of calculation, this can also be selected differently. The progressions of the curves 103, 104 between F0 and F1 do not have to be linear, but can also be selected logarithmically, for example. The curves 103, 104 can be discontinuous, contain jumps, and need not be strictly monotonically increasing or decreasing.

It may be provided that the user can adjust the parameters of the curves 103, 104 individually or together. For example, it can be provided that the user can shift F0 and F1, can shift one curve 103, 104 against the other, or can select a completely different curve. It is also possible to specify only one switching point, below which the value of the second curve 103 is 0 and that of the first curve 104 is 1, and above which the value of the second curve 103 is 1 and that of the first curve 104 is 0.

In addition to the wide-distance measurement value and the short-distance measurement value, the computing unit 17 preferably also receives the data from the inertial navigation systems 13 and 19. In the computing unit 17, the relative changes in movement and the alignment of the camera 3 and the marking unit 11 with respect to each other are calculated from the data from the inertial navigation systems 13 and 19. From the allowed distance changes per time unit, the wide-distance measurement value and the short-distance measurement value are corrected. If the wide-distance and short-distance measurement values contain jumps in the distance which are not detected by the inertial navigation system, the possible distances are determined from the last valid distance parameter F and the movement data of the inertial navigation systems. From this the new distance parameter F is calculated. How strongly this correction of the movement data is to be weighted and in which time frame the distance measurements of the inertial navigation systems 13 and 19 are to affect the short-distance and wide-distance measurement values can be predetermined by the user in the adjustment unit 15.

The transfer function may contain a further curve if the measurement values of the inertial navigation system 13 are also included in the calculation as further measurement values, or there can be several transfer functions. A multi-stage calculation method can also be used, in which, for example, two measurement values are first combined with each other via a transfer function, and the result value is then combined with the third measurement value via a second transfer function. For example, after adding the weighted short-distance measurement value and the wide-distance measurement value, a calculation of the resulting value with the second further measurement value of the inertial navigation system 13 can be used to calculate the distance parameter, preferably via a transfer function.

The invention claimed is:

1. A method for measuring distance in order to focus at least one camera lens of a camera, the method including the steps of:

using a wide-distance measuring system, which is suitable for measuring greater distances, to measure the distance of an object and provide at least one wide-distance measurement value representing the measured distance, using the wide-distance measuring system, including at least one microwave measuring system, for focusing the camera lens, using a further measuring system to measure the distance of the same object and providing at least one further measurement value using at least one further measuring system representing the measured distance, whereas the wide-distance value and the further measurement are measured at the same time; and transmitting the wide-distance measurement value and the further measurement value to a display device and displaying the transmitted wide-distance measurement value and the transmitted further measurement value on the display-device at the same time.

2. The method according to claim 1, further including the step of calculating a distance parameter from the at least one further measurement value and the wide-distance measurement value via a transfer function.

3. The method according to claim 1, characterized in that the at least one further measurement value is a distance measurement value.

4. The method according to claim 1, characterized in that at least one further measurement value of the at least one further measurement value is a directional value, a velocity value or an acceleration value of the object.

5. The method according to claim 1, characterized in that the further measuring system includes at least one short-distance measuring system suitable for measuring short distances and measures a distance of the object to the camera and provides at least one short-distance measurement value as a further measurement value of the at least one further measurement value.

6. The method according to claim 2, characterized in that the at least one further measurement value and the wide-distance measurement value are weighted differently depending on the transfer function when calculating the distance parameter.

7. The method according to claim 6, characterized in that the weighted at least one further measurement value and the weighted wide-distance measurement value are added to calculate the distance parameter.

8. The method according to claim 6, characterized in that the at least one further measurement value below a threshold setting value of the transfer function is weighted more strongly by the transfer function than the wide-distance measurement value, and in that the at least one further measurement value above the threshold setting value is weighted less strongly by the transfer function than the wide-distance measurement value.

9. The method according to claim 4, characterized in that the further measuring system includes at least one acceleration sensor of at least one marking device attached to the object, and the at least one acceleration sensor provides at least one acceleration value, and in that the acceleration value is used to calculate the further measurement value.

10. The method according to claim 9, further including the step of using at least one IMU measurement value of at least one inertial navigation system, the at least one inertial navigation system includes at least the acceleration sensor and at least one rotation rate sensor, as the at least one further measurement value.

11. The method according to claim 2, characterized in that a setting value of the transfer function is made dependent on at least the at least one further measurement value, the at least one wide-distance measurement value or both.

12. The method according to claim 2, characterized in that at least one setting value of the transfer function is dependent on the distance parameter.

13. The method according to claim 2, characterized in that at least one setting value of the transfer function is dependent on the temporal change of the at least one further measurement value, the at least one wide-distance measurement value or both.

14. The method according to claim 2, characterized in that at least one characteristic parameter of the transfer function is adjustable for the user of the camera.

15. The method according to claim 5, characterized in that the short-distance measuring system further includes at least an ultrasonic measuring system, radar measuring system, stereoscopic camera array, TOF camera system laser or LIDAR measuring system.

16. The method according to claim 15, further including the steps of emitting ultrasonic waves from an ultrasonic emitter of the ultrasonic measuring system in at least one direction in the region of the camera, detecting reflections of these ultrasonic waves by an ultrasonic sensor, and a calculator unit calculates a short-distance measurement value of the reflecting object.

17. The method according to claim 1, further including the steps of emitting microware signals from the at least one microwave measuring system via a microwave emitter in the region of the camera and responding to the microwave signals via at least one portable microwave responder of at least one marking device attached to the object.

18. The method according to claim 2, further including the step of calculating the distance parameter using a further acceleration sensor attached to the camera.

19. The method according to claim 5, further including the steps of providing at least one directional value, via the wide-distance measuring system, dependent on the direction of the object to the camera, and at least the orientation of the short-distance measuring system is dependent on the at least one directional value.

20. Distance-measuring unit for measuring a distance between a camera and an object for focusing at least one camera lens of a camera on an object, wherein the distance-measuring unit comprises:

at least one wide-distance measuring system and at least one further measurement system, whereas the at least one wide-distance measuring system includes a microwave measuring system, the at least one wide-distance measuring system is configured and arranged for measuring greater distances and for measuring at least one wide-distance measurement value representing the measured distance of the object, the at least one further measuring system is configured and arranged for measuring a further measurement value at the same time as the measurement performed by the wide-distance measurement system, the further measurement value representing the distance of the same object, and an adjustment unit connected to the further measuring system and to the wide-distance measuring system, wherein the adjustment unit is configured and arranged for transmitting the wide-distance measurement value and the further measurement value to a display device and wherein the display device is configured and arranged for displaying the transmitted wide-distance measurement value and for displaying the transmitted further measurement value at the same time.

21. The distance-measuring unit according to claim 20, wherein the further measuring system includes at least one short-distance measuring system configured and arranged for measuring shorter distances, and for measuring at least one short-distance measurement value as a further measurement value.

22. The distance-measuring unit according to claim 20, further including at least one marking device configured and arranged for attachment to the object of the further measuring system, the at least one marking device includes at least one acceleration sensor configured and arranged for measuring at least one acceleration measurement value used calculating the further measurement value.

23. The distance-measuring unit according to claim 22, characterized in that the at least one marking device further includes at least one inertial navigation system having at least the acceleration sensor and at least one rotation rate sensor.

24. The distance-measuring unit according to claim 23, characterized in that the inertial navigation system is connected to the wide-distance measuring system and data of the at least one inertial navigation system is transmitted by radio.

25. The distance-measuring unit according to claim 23, characterized in that the at least one inertial navigation system is connected to a direction setting device of the short-distance measuring system.

26. The distance-measuring unit according to claim 23, characterized in that the adjustment unit is set up to calculate a distance parameter from the further measurement value and the wide-distance measurement value via a transfer function.

27. The distance-measuring unit according to claim 26, characterized in that a computing unit of the adjustment unit is configured and arranged to weight the wide-distance measurement value and the further measurement value as a function of a transfer function and calculates the distance parameter therefrom.

28. The distance-measuring unit according to claim 21, characterized in that the at least one short-distance measuring system includes an ultrasonic measuring system, radar measuring system, laser measuring system, stereoscopic camera arrangement, TOF camera system or LIDAR measuring system.

29. The distance-measuring unit according to claim 20, characterized in that the at least one wide-distance measuring system includes a portable marking device for attachment to the object.

30. The distance-measuring unit according to claim 20, characterized in that the distance-measuring unit includes a portable marking device for attachment to the object, and in that the further measuring system includes at least one acceleration sensor associated with the marking device.

* * * * *